United States Patent [19]
Valentine

[11] 3,991,488
[45] Nov. 16, 1976

[54] EDUCATIONAL DEVICE FOR LEARNING PRINCIPLES OF STANDARD TRANSMISSION

[75] Inventor: Charles G. Valentine, Stamford, Conn.

[73] Assignee: Xerox Corporation, Stamford, Conn.

[22] Filed: Dec. 27, 1973

[21] Appl. No.: 428,982

Related U.S. Application Data

[63] Continuation-in-part of Ser. No. 345,949, March 29, 1973, abandoned.

[52] U.S. Cl. .................................... 35/13; 35/7 A
[51] Int. Cl.² .................................... G09B 25/02
[58] Field of Search ............ 35/7 A, 8 R, 8 A, 9 R, 35/9 A, 9 B, 9 C, 10, 11, 13, 19 R, 19 A, 30, 48 R, 49, 54; 40/142 A

[56] References Cited
UNITED STATES PATENTS

| | | | |
|---|---|---|---|
| 3,077,696 | 2/1963 | Barnett et al. ................. | 35/19 A |
| 3,245,156 | 4/1966 | De Bloois et al. ............. | 35/8 A |
| 3,423,846 | 1/1969 | Arend ............................ | 35/19 A |
| 3,514,873 | 6/1970 | Stobbe .......................... | 35/7 A X |
| 3,538,626 | 11/1970 | Frank ............................ | 35/48 R |
| 3,654,711 | 4/1972 | Taylor ........................... | 35/7 A X |

OTHER PUBLICATIONS

Rosengren, H. J.; "Three-Dimensional Teaching Aids for Trade and Industrial Instruction", 1961, p. 5.

*Primary Examiner*—Richard C. Pinkham
*Assistant Examiner*—Vance Y. Hum

[57] ABSTRACT

An educational kit for teaching the basic principles involved in the operation and use of a standard transmission as found in an automobile is disclosed. The kit comprises in combination instructional equipment, a simulator board having printed thereon graphic indicia representative of a schematic view of a transmission housing, and a plurality of manipulative pieces, said pieces having printed thereon graphic indicia including indicia representative of the gears that are found in a standard transmission, said pieces being adapted for manipulation within the confines of the simulator board for graphically depicting the correct arrangement and function of the various gears found within a standard transmission.

8 Claims, 8 Drawing Figures

AUDIO VISUAL MEANS

FIG. 6

WORK SHEETS

EDUCATIONAL DEVICE FOR LEARNING PRINCIPLES OF STANDARD TRANSMISSION

RELATED APPLICATIONS

This application is a continuation-in-part of Applicants copending application Ser. No. 345,949, filed Mar. 29, 1973, now abandoned.

BACKGROUND OF THE DISCLOSURE

I. Field of the Invention

This invention relates to an educational device for training in automotive technology, and more particularly to an educational kit primarily for demonstrating, illustrating, testing and instructing the basic principles of standard transmissions.

II. Description of the Prior Art

A problem of increasing difficulty in the education field is that of providing relatively simple means for instructing students in a particular technology. This problem is particularly acute in community colleges, vocational high schools, trade schools, corporations which offer on-the-job training, in military service training schools, and other special schools where various types of technologies, such as for example, mechanical and electrical technologies, are sought to be taught on a simplified basis. This problem has been accentuated by the large number of new technological fields that have been developed over the past several years, and also by the large number of students seeking to gain knowledge of these fields. These developments, coupled with the high cost and complexity of the various educational devices used in schools to teach these technologies have given rise to a tremendous demand for simple, relatively inexpensive, rugged, easily assembled, relatively portable and easily understood educational devices to teach these technologies.

Furthermore, at some point during the learning process, it is desirable that the student extend beyond textbooks, manuals or diagrams and be afforded the opportunity to see, examine, and manipulate the system under study. Physical manipulation of the system aids the student in better understanding what he hears or reads about and therefore complements the entire learning process.

Recent years have marked the introduction of a large number of educational teaching devices aimed at instructing students in various technologies. The most common of these devices are the mechanical or computer devices designed to be used by individual students. The theory behind the increasing use of such devices is that account is made of the individual differences in ability, speed and grasp of subject matter, thereby permitting the student to learn at his own pace and with minimum supervision by the teacher. Some of these devices, such as the video computer type devices, are designed to take over a substantial part of the responsibility for providing and transmitting basic information. Others are designed simply to supplement the teacher's own instructional materials by introducing new dimensions into the learning process whereby, for example, spelling may be associated with pictures of objects, mathematical concepts associated with relative sizes and shapes of objects, or correct responses to questions posed by a computer type device rewarded by permission to proceed. Although numerous efforts have been made to construct simple, relatively inexpensive, rugged, easily assembled, relatively portable and easily understood educational devices, known devices, although satisfactory in some of these respects, do not possess these combined advantages when compared to the novel and advantageous educational kit of the present invention.

The advantages of a teaching method using a device geared for the individual whereby both the teacher and the individual may be appraised of the individual's progress are not restricted to the traditional elementary or high school subjects; occupational learning materials that take into account individual differences in ability, speed and grasp of subject matter also have a better chance of being effective. However, at the present time, there are very few effective educational devices available in the community colleges, the junior colleges, the vocational high schools, the trade schools and other special schools where various types of mechanical, electrical, medical or other occupational technologies are sought to be taught on a simplified and individualized basis. There is a great need for programmed instructional materials in the various areas of occupational technology such as for example, electronics, automotive technology, drafting, heating and air conditioning, and in the medical and chemical areas of technology, as well as in the traditional areas of high school study.

SUMMARY OF THE INVENTION

It is therefore an object of the present invention to overcome the disadvantages of the prior art educational devices and to provide an educational kit which is simpler, more durable, less expensive, more easily assembled and still more pleasing from a design viewpoint than prior art devices and otherwise more suitable for use in various types of learning institutions for understanding the operation of a standard transmission.

It is a further object of this invention to provide programmed educational kits which present information using a multimedia approach.

It is a further object of this invention to provide an educational kit which is compact when assembled.

It is a further object of this invention to provide an educational kit which is quickly disassembled for easy storage in a very small space.

It is a further object of this invention to provide an educational kit which does not require a single grommet, screw, bolt, rivet or similar fastening type connection.

It is a further object of this invention to provide an educational kit suitable for teaching students the fundamentals and theory involved in the internal mechanism of a standard transmission.

It is a further object of this invention to provide an educational kit which enables an instructor to play a more active role in student learning.

It is a further object of this invention to provide an educational kit which enables the student to learn using several forms of communication.

It is a further object of this invention to provide an educational kit which enables the student to participate in different kinds of learning experiences; i.e., the student listens to information while viewing a series of related visuals, such as photographs, drawings, written information, etc., and participates in a manipulative activity which gives the student a chance to try doing himself what he has been shown and told how to do.

It is a further object of this invention to provide an educational kit which provides means to test the student while he is learning.

It is still a further object of this invention to provide an educational kit which, in addition to its educational features and mechanical advantages, possesses a pleasing design.

The foregoing objects and others are accomplished in accordance with the present invention by providing an educational kit for teaching the operation of a standard transmission comprising in combination: a simulator board having a surface of magnetically attractive material and having graphic indicia on the surface thereof defining a schematic sectional view of an automobile transmission housing; a plurality of magnetically attractive manipulative pieces each individually bearing on their surfaces graphic indicia defining items relating to the subject matter of standard transmissions, said pieces comprising (i) a plurality of pieces containing indicia defining the names of various portions of the sectional view of the transmission housing, the pieces adapted for positioning within the confines of the simulator board for identifying various portions of the transmission housing; (ii) a plurality of pieces adapted for positioning within the confines of the transmission housing including pieces schematically representing an input gear, countershaft gears, mainshaft gears, synchronizers, reverse gear, and a reverse idler shaft, each adapted for positioning within the transmission housing whereby the proper gear arrangements that are involved in the flow of power for a specific forward gear or reverse gear can be graphically depicted; and (iii) a plurality of pieces representing arrows, each of the arrow pieces adapted for positioning with the pieces defined in (ii) whereby the power flow through the transmission when engaged in a particular gear arrangement can be graphically depicted; the magnetically attractive board or alternatively each of the magnetically attractive pieces being magnetic to provide a mutual attraction between the board and the pieces; a display board for the manipulative pieces including a sheet of magnetically attractive material, the display board having graphic indicia on a surface thereof in spaced relationship, the graphic indicia corresponding to the indicia present on each of the manipulative pieces, the manipulative pieces adapted for storage on and removal from the display board; and audio-visual instructional means for presenting information relevant to the operation of a standard transmission including information defining the indicia on the pieces and the indicia on the simulator board, whereby (i) various parts of a standard transmission can be properly identified, (ii) the proper location of the gears in a standard transmission when in position for first, second, third, fourth or reverse gear can be properly determined and simulated, and (iii) the power flow through the transmission for a specific forward gear or for reverse gear may be simulated, by positioning and manipulating the pieces on the simulator board in response to the instructional means.

The educational kit in accordance with the invention is designed to teach basic fundamentals relating to standard transmissions using a programmed multimedia approach whereby the student hears and sees information, performs by answering questions, solves problems and manipulates objects. Each time a student learns something new, he responds to this new knowledge or skill to make sure he has learned it correctly. First, he performs an activity such as by answering a question, solving a problem or manipulating a device. Then he finds out immediately if the action is correct by comparing the result of his action with the one provided by the program. If the student finds that his answer is correct, this "instant feedback" motivates him to continue learning. If he discovers that his answer is wrong or inadequate, he can stop at that point and find out where his error is.

The educational kit is designed for individual use, use by small groups without the need for extensive supervision or participation by an instructor or use by groups with an instructor. It permits the student to learn at his own pace, and also affords him the chance to capitalize on the way he learns best because he participates in different kinds of learning experiences. He listens to information while viewing a series of related visuals and participates in manipulative activity which gives him a chance to try doing himself what he has been shown or told how to do. He is thus totally involved in the learning process.

BRIEF DESCRIPTION OF THE DRAWINGS

For a better understanding of the invention, as well as other objects and further features thereof, reference is made to the following detailed disclosure of this invention taken in conjunction with the accompanying drawings wherein.

DESCRIPTION OF THE PREFERRED EMBODIMENTS

Figure 1:
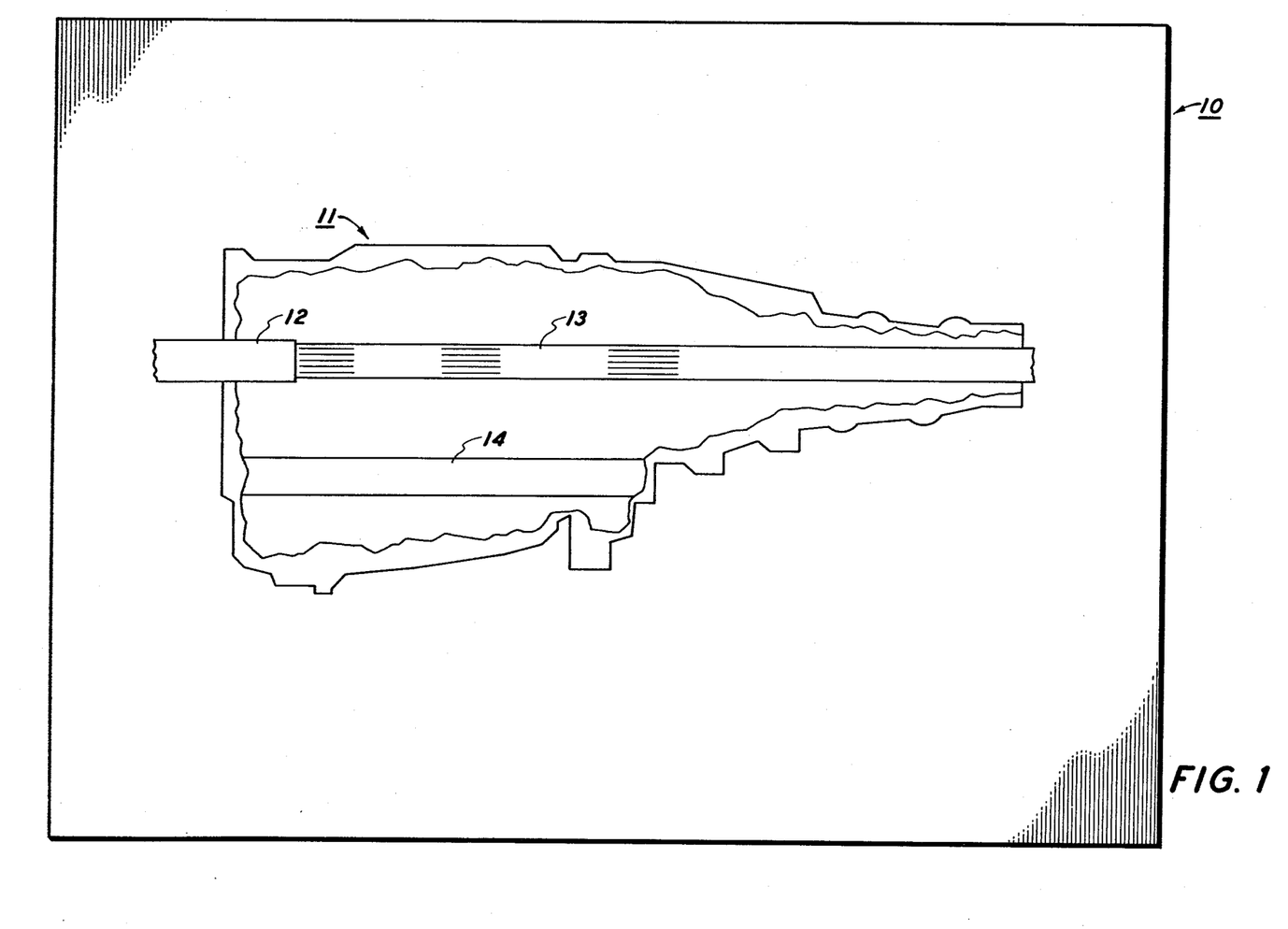
FIG. 1 is a plan view of a preferred simulator board in accordance with the invention.

In FIG. 1, there is shown a simulator board 10 which actively allows a student to actually use his hands as a learning tool as well as his eyes and ears. By performing various activities as explained hereinbelow using the simulator board and its accessories, the student takes an active part in the learning process and achieves an understanding of the operation of a standard transmission more quickly. The simulator board 10 is shown having printed thereon graphic indicia 11 representative of a schematic sectional view of a typical four-speed, fully synchronized transmission with gears removed. For the purposes of illustration, the engine would be to the left of the transmission and the driveshaft and wheels to the right. The schematic view of the transmission 11 includes graphic indicia 12 representing a shaft leading from the engine to the transmission, ie., the input shaft; indicia 13 representing the mainshaft; and indicia 14 representing a countershaft.

The simulator board 10 can be constructed by numerous methods. For example, the board can be constructed of a magnetically attractive sheet of ferris metal, such as for example, galvanized steel or a magnetic ferrite plastic, over which is painted a neutral background color, such as for example, a yellow or white enamel. The graphic indicia present on the board can then preferably be printed over the enamel background in a suitably contrasting color, such as for example, black. The printing may be accomplished by any suitable means, such as for example, a silk screening process. Although the simulator board may consist solely of a thin sheet of metal with suitably smooth edges, the magnetically attractive sheet is preferably laminated to a suitable backing member, such as Masonite, which imparts a desirable rigidity thereto and also allows the simulator board to be conveniently handled. Thus, in one preferred embodiment of this invention, the simulator board comprises a thin sheet of ferris metal having a thickness of about 1/32 inch laminated to a backing member made from a rigid material such as Masonite, fiber board, a resinous material, the backing member having a preferred thickness of about ¼ inch. The edges of the completed board can be covered with a plastic material to obtain a neat appearance and also to avoid the problem of having sharp edges. The simulator board can also be constructed of a magnetically attractive sheet of ferris metal such as galvanized steel which is secured to a sheet of a rigid polymeric material such as a vinyl material. In this embodiment, the graphic indicia is placed on the polymeric material as described above. The dimensions of the simulator board should be such that the board can be conveniently used by the student at a given workplace. Boards having dimensions of about 15 × 20 inches, or approximately 300 square inches, are particularly suitable.

To help the student learn about the operation of a standard transmission, the student is asked to label various parts of a standard transmission and construct a typical fourspeed, fully synchronized transmission by placing various manipulative pieces in their correct positions on the simulator board 10 in the manner as described hereinbelow. The preferred manipulative pieces used with the educational kit in accordance with the present invention are shown in FIGS. 3A–3K. Each of these pieces may consist of a relatively flat sheet of material, such as for example, a rigid polymeric material upon which is printed various graphic indicia and to the underside of which is secured a magnetically attractive material. Alternatively, the manipulative pieces can be constructed of a layer of a ferris metal, such as galvanized steel, a layer of a rigid polymeric material, such as a vinyl material upon which is printed the graphic indicia, and a magnetically attractive material secured to the metal layer. In a preferred embodiment of this invention, the manipulative pieces are made of a plastic material, such as for example, polyvinyl chloride, having a thickness of about 1/16 inch with smaller sections of a magnetically attractive material laminated to the underside thereof. The smaller sections of magnetically attractive material not only serve to provide the means for securing the manipulative pieces to the simulator board, but also serve to provide a gap between the manipulative piece and the surface upon which it is resting to facilitate gripping and manipulation of the piece on flat surfaces.

Figure 2:
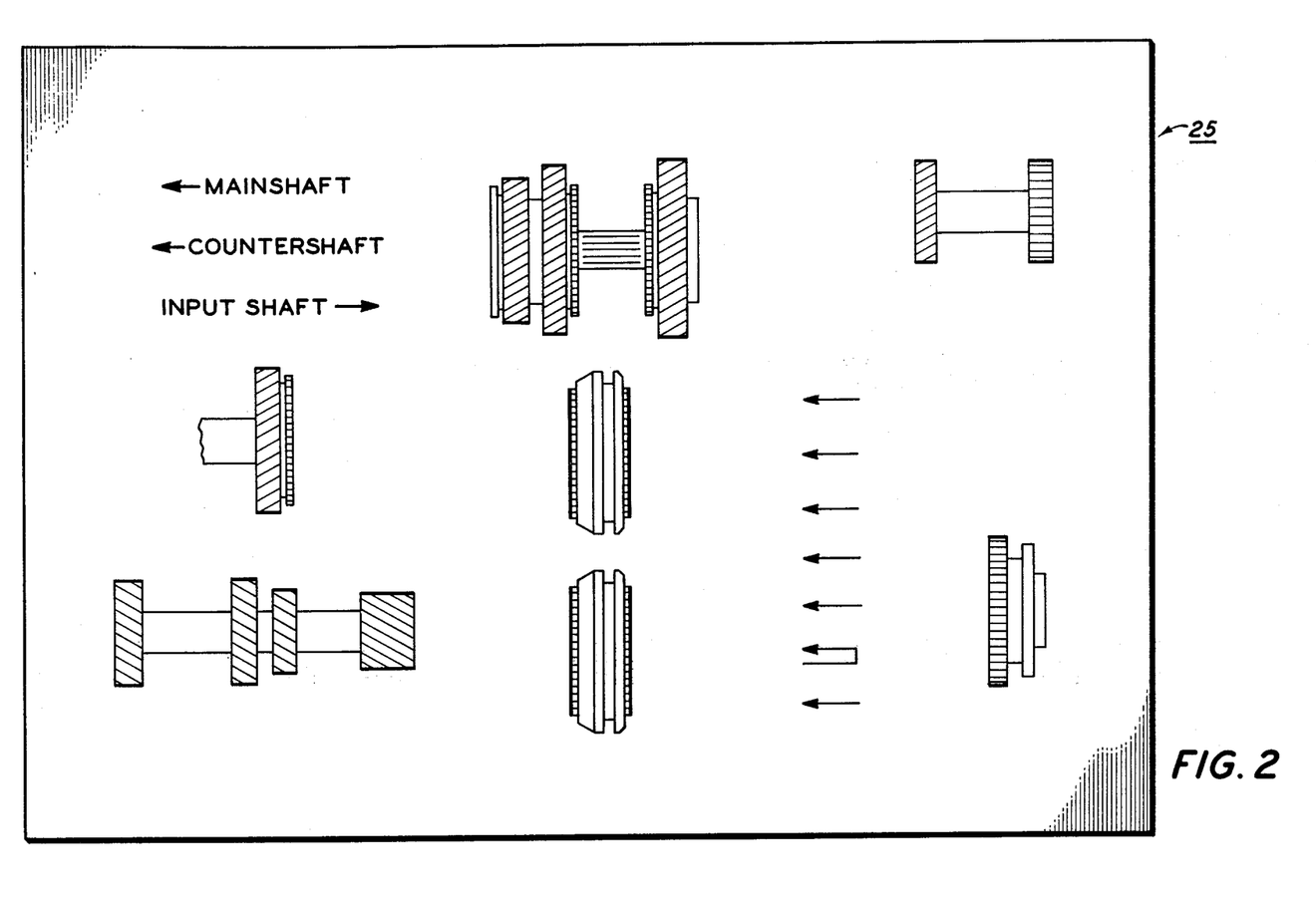
FIG. 2 is a plan view of a preferred embodiment of a display board.

In accordance with a preferred embodiment of this invention there are various manipulative pieces as represented in FIGS. 3A–3K which can be used with the simulator board 10 to learn about the operation of a standard transmission. Although some of the manipulative pieces have specific values or terms imprinted thereon, such as for example FIG. 3G which represents the mainshaft or FIG. 3A which represents the three mainshaft gears, it is to be understood that it is within the scope of this invention to include as graphic indicia on the pieces any item, term or valve which relates to nomenclature concerning a standard transmission and which would be useful for placement on the simulator board. For purposes of illustrating preferred embodiments of the present invention, manipulative pieces including one piece representing "Mainshaft" (FIG. 3G), one piece representing "Countershaft" (FIG. 3H), one piece representing "Input Shaft" (FIG. 3I) six pieces representing straight arrows 15 (FIG. 3C), one piece representing a curved arrow 16 (FIG. 3E), one piece each representing an input gear 17 (FIG. 3J), the countershaft gears 18 (FIG. 3K), the mainshaft gears 19 (FIG. 3A), a reverse gear 20 (FIG. 3F), a reverse idler shaft 21 (FIG. 3B) and two pieces representing synchronizers 22 (FIG. 3D) which could be used with simulator board 10 and display board 25 as shown in FIG. 2 to learn about the operation of a standard transmission. The size and shape of these manipulative pieces is such that they fit and can be manipulated within the confines of the simulator board at the appropriate location on the board.

In FIG. 2 there is shown display board 25 having printed thereon graphic indicia representative of the graphic indicia shown on each of the manipulative pieces. The purpose of the display board is to serve as a display and storage area for the magnetically attractive pieces which are used in conjunction with the simulator board. Each of the graphic indicia printed on the display boards corresponds to the indicia printed on one of the manipulative pieces thereby facilitating systematic storage and display of the pieces and allowing for quick inspection to determine that all of the pieces are accounted for. The display board is also preferably constructed of a magnetically attractive material similar to the simulator board and the background and graphic indicia may be printed thereon in the same or similar manner.

As indicated above, the surfaces of the simulator board 10, the display board 25 and at least the bottom portions of the manipulative pieces are made from or contain a magnetically attractive material. The term magnetically attractive material is intended to encompass material that is either itself magnetic or material that is attractive to a magnet. Thus, where the surface of the simulator board is magnetic, the bottom portions of the manipulative pieces need be only of a material that is attracted to a magnet. In a preferred embodiment of this invention, the bottom portions of the pieces have laminated thereto a section of a magnetic material such as a magnetic plastic or metal, and the simulator board and display board are made of material that is attractive to a magnet, such as galvanized steel.

Various kinds of instructional means can be employed with the educational kit in accordance with the invention. For example, one of the preferred embodiments for instructional means is an audiovisual presentation using slides or film strips in conjunction with a descriptive audio account of the visuals, such as an audio cassette. The visual materials are synchronized with the audio presentation. The audiovisual portion makes it possible for a student to learn by listening to a discription while seeing what is being described. A recorded narrator provides background information, describes equipment, or explains principles of operation while a series of illustrated visuals (photographs, graphs, drawings, written material, etc.) is shown to the student synchronized with the audio presentation. The narrator also tells the student, for example, how to proceed; whether to observe something that is being shown to him, to perform an activity on the simulator board 10, or to complete a question or problem on the student's worksheet; he suggests points at which the student might ask for help and, along with the visual portion provides answers to the questions presented on the worksheets or information about the simulator or equipment. The audiovisual presentation is stopped each time the narrator asks the student to do something. The student starts the sequence again after he completes the activity.

The audiovisual equipment needed, of course, will vary depending on the type of instructions to be given. A rear screen projector for small groups, or a projector and screen for a classroom presentation may be used. For the audio presentation either visual projection equipment with built-in audio capability or a separate cassette recorder may be used. The audio presentation may be on, for example, cassettes, and the visual portion on, for example, 35 mm film strip or slides.

In order to give the student an opportunity to check his grasp of the material he is learning, the student is called upon throughout the unit to construct definitions, label components, answer questions, and solve problems. To achieve these objects the kit preferably includes work sheets that restate the question or problem and provide working space and answer blanks. The work sheets are preferably laminated so that the student can easily erase an answer and redo a problem with the added advantage that the sheets can be cleaned off for use by another student. The work sheets are also beneficial in telling the instructor about a student's work habits and whether or not he is benefiting from the kit. In addition, an instructor's review of the work sheets can help him locate the point at which the student is having difficulty.

Figure 3:
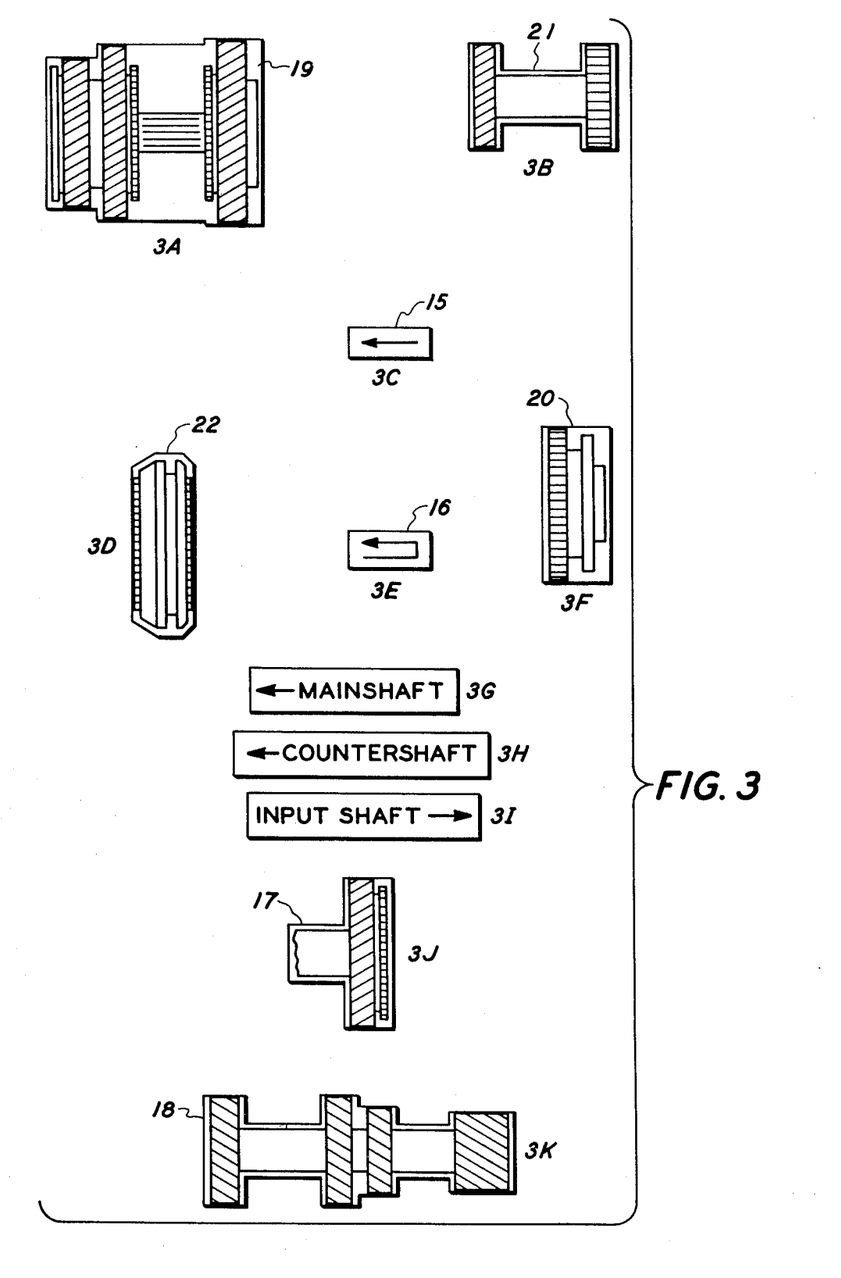
FIGS. 3A–3K are plan views of the preferred embodiments of the manipulative pieces in accordance with the invention.

All of the above materials can be conveniently housed in a compartment-like case for easy use and storage. Thus, the educational kit which includes the simulator board 10, the display board 25, the manipulative pieces as shown in FIG. 3, the instructional means, such as video slides or tapes, the audio cassettes, and the work sheets, can all be contained within one case. The kit may also include sample tests or quizzes which can be given by the instructor before and after use of the program and an instructor's manual.

An example of how a preferred embodiment of an educational kit in accordance with the present invention may be used to help a student in the understanding of the operation of a standard transmission, and more particularly, to help a student learn how the principle parts of a fully synchronized, four-speed transmission operates to transmit power to the driving wheels of an automobile, is as follows: The first portion of the audio visual presentation begins with a discussion relating to the various reasons why a car needs a transmission. During this discussion the concept of torque and the lever is discussed in detail. Thereafter, the presentation discusses the concept of gears and how they operate in the same way as levers. The turning of a small gear by a large gear, a large gear by a small gear, and the turning of one gear by another gear of the same dimensions is also discussed in detail including a discussion of the relationship of gear size with rate of turn and torque.

During the audio visual presentation, as the student is introduced to various concepts, terms, definitions, etc., he may be asked to copy certain of these items in his worksheets. Alternatively, the student might be asked a specific question relating to material previously presented to the student by the audio visual presentation. In this instance, the student would be referred to a specific item in his worksheets where he would be asked to answer a question. After answering the question, the visual portion of the presentation would then present the correct answer to the student for him to check with the answer he has written on his worksheet. In those instances where answers other than those shown on the visual portion of the presentation would be correct, this information is also presented to the student. For example, on the visual portion of the presentation the student might be shown two gears which are described by the audio portion as being of the same size. The audio portion would then refer the student to a specific item in his worksheet and ask him to describe the effect of this gear arrangement on torque and speed. The instructional material is presented to the student by means of visual film strip and a synchronized audio presentation.

The presentation next focuses on a detailed description relating to gear ratios. For example, the student is told that the amount of change in torque is in direct proportion to the ratio between the number of teeth in the gears. Therefore, if a driving gear has fifteen teeth, and the gear being driven by the driving gear has forty-five teeth, the ratio is three to one. The gear being driven or the driven gear will revolve at one-third the speed of the driving gear, but will produce three times the torque. The ratio between two gears is calculated by first counting the number of teeth on each gear, and then the number of teeth on the driving gear is divided into the number of teeth on the driven gear. The student is informed that gear ratios are sometimes called reductions because the engine speed is reduced while its torque is increased. Thereafter, the effect that the transmission has on an engines torque to meet various driving conditions is discussed in detail. Also, the differences and similarities between four-speed and three-speed transmissions is discussed.

The students attention is then directed to the fact that when a driving gear is turning a second gear, i.e., the driven gear, the gears turn in opposite directions. For the driving and driven gears to turn in the same direction, a third gear, called a counter gear, must be added. The driving gear turns the counter gear, which then turns the driven gear in the same direction as the driving gear. In calculating gear ratios for this three gear arrangement, the student is informed that the number of teeth on the driving gear is first divided into the number of teeth on the counter gear. Next, the number of teeth on the counter gear is divided into the number of teeth on the driven gear. The two gear ratios obtained in this manner are then multiplied to yield a ratio for the gear set. Thereafter the student is informed that most transmissions use four gears in each set of gears, i.e., there are two counter gears connected by a shaft, and torque is transmitted from the gear connected to the engine to the counter gears and from the counter gears to the gear connected to the drive shaft which goes to the wheels.

At certain points during the presentation the student is asked to turn to the simulator board 10. To further help the student in understanding the operation of a standard transmission, he employs the simulator board and manipulative pieces to, for example, define concepts and perform various experiments. For example, the student is referred to the simulator board which depicts a schematic sectional view of a typical four-speed, fully synchronized transmission and is told to consider that the engine would be to the left of the transmission and the drive shaft and wheels to its right. The presentation first explains that the section of the shaft 12 from the engine is called the input shaft because it receives power directly from the engine, via the fly wheel and clutch, and transfers it to the transmission. The other section of the shaft 13 is called the mainshaft, and is connected to the rear wheels via the drive shaft and differential. The lower shaft 14 is called the countershaft because it carries the counter gears. Thereafter the presentation asks the student to correctly identify the three shafts on the simulator board by properly placing those manipulative pieces shown in FIGS. 3G, 3H, and 3I on the simulator board.

The presentation then describes that power is transmitted from the engine to the transmission through the input gear which is described as an integral part of the input shaft and which rotates whenever the clutch is engaged. The presentation goes on to describe that power from the input gear passes through the countershaft gears which rotate whenever the input gear involves. The countershaft gears, in turn, cause the mainshaft gears to revolve. In a synchronized transmission, the student is informed that the mainshaft gears are constantly revolving whenever the clutch is engaged because they are always meshed with the countershaft gears. This is possible because the mainshaft gears are not attached to the mainshaft, but rather rotate freely around it. The student is told that in older transmissions, shifting gears meant that the gears actually moved back and forth on the mainshaft and engaged the countershaft gears only when they were needed. A tremendous disadvantage of this was that shifting had to be done at precise engine speeds in order for the countershaft gears to engage the driven gears. Newer transmissions are designed on the synchromesh principle, which basically means that all gears except reverse are constantly in mesh and thus constantly turning freely around the mainshaft. Synchromesh sleeves, also called synchronizers, engage or disengage to transmit power through the proper gears. They allow the driver more freedom in selecting gears and eliminate dangerous clashing of gears. The synchronizers move back and forth on grooves or splines on the mainshaft to lock into the gears and transmit the gears power to the mainshaft.

In the second portion of the program the students attention is directed to a detailed examination of what happens inside a typical transmission gear box when a driver shifts gears. This is best illustrated to the student by having the student use the simulator board and various manipulative pieces. For example, as the audio portion explains the functions of the input, countershaft and mainshaft gears, the student is told to correctly position these gears within the transmission housing shown on the simulator board. Thereafter the student is told that there are two synchronizers in most four-speed fully synchronized transmissions, although some may use four synchronizers. The student is told that he will use two synchronizers on the simulator board to synchronize the first and second gears, and the third and fourth gears. The student is also informed that reverse gear need not be synchronized because the mainshaft must stop and rotate in the opposite direction when reverse gear is required. The two synchronizers permit engaging gears at different speeds. They match the speed to the rotating mainshaft and gear so that the speeds are equal when the gear is connected to the mainshaft through the synchronizer. The student is then told to take the two synchronizers as shown in FIG. 3D and place them on the splines between the mainshaft gears on the simulator board. The student is informed that each synchronizer is moved back and forth between two gears by a shifting fork that is connected by a linkage to the gear shift in the car. Thereafter the presentation goes into a detailed description of the internal structure of a typical synchronizing unit and its function. As the student works with the simulator board in constructing the proper arrangement of all the gears and synchronizers for a standard transmission, the visual portion of the presentation shows the student actual pictures of cut-away portions of an actual transmission housing illustrating the gears that he is working with.

Figure 4:
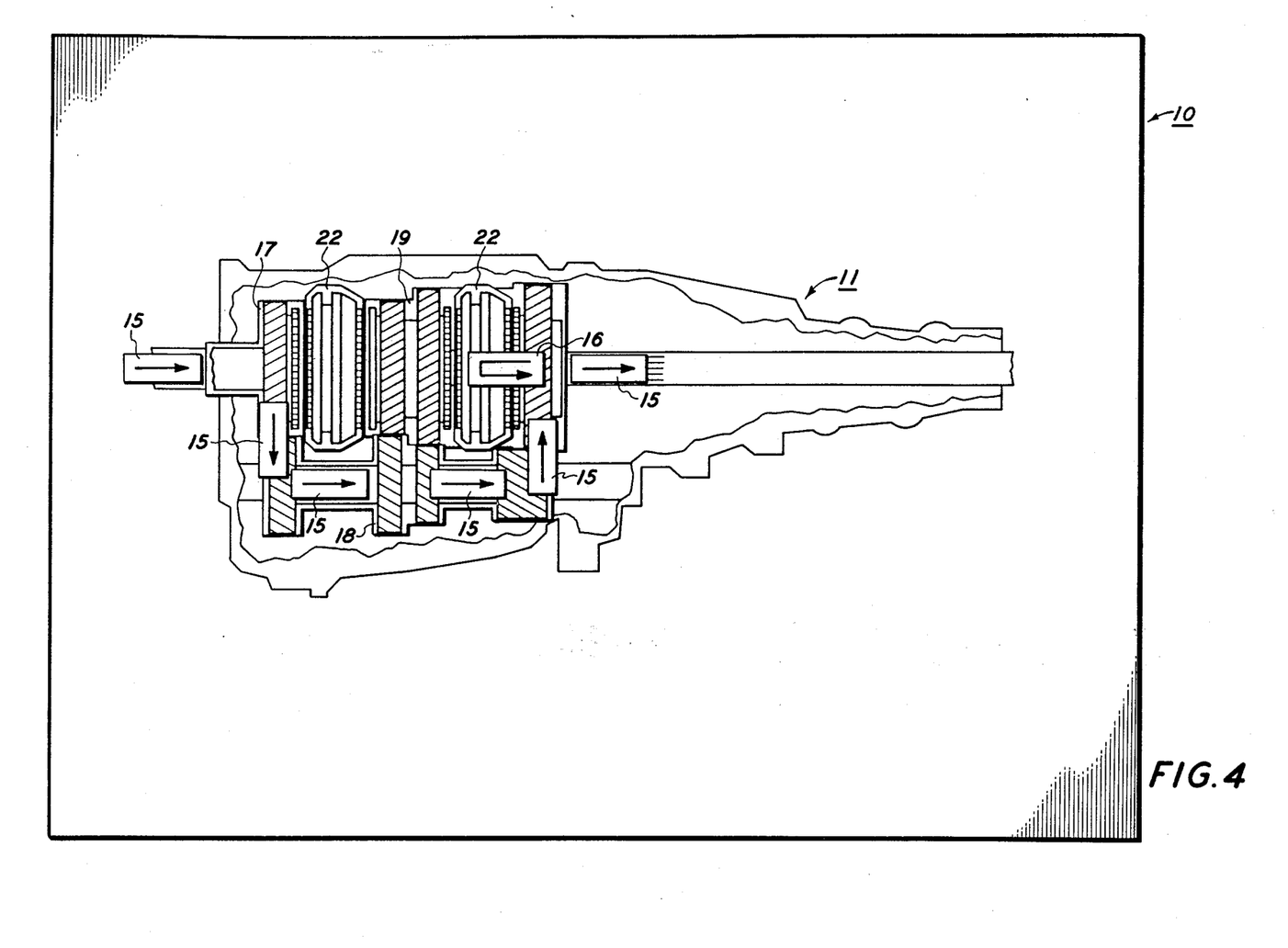
FIG. 4 is a plan view of the simulator board shown in FIG. 1 with certain of the manipulative pieces as shown in FIG. 3 in place on the board.

The presentation then explains that engine torque is transmitted by the input gear to the first gear on the countershaft. The torque of a countershaft, which is turning as a single unit, then passes to the appropriate gear on the mainshaft. The mainshaft gear is not itself connected to the mainshaft in a way that allows it to transmit power to the mainshaft, but rather it is splined to a synchronizer which is splined to the mainshaft. The gears torque, therefore, is transmitted to the mainshaft through the synchronizer. When the transmission is in first gear, the mainshaft is turning at a rate equal to the first speed gear. The second and third speed gears are turning faster than this, since their counter gears are driving them. The shaft to the wheels will be driven at the speed of the first gear. When the transmission shifts from first to second gear, the second gear must be slowed down to the speed of the mainshaft, before the synchronizing sleeve engages it. As its name implies, the synchronizer acts to synchronize the speed of the gear to be engaged, with the speed of the mainshaft, which is turning at the synchronizers own rotational speed. With the first and second gear synchronizing engaging the first gear, power from the input shaft passes through the input gear, the counter shaft gear, and the first gear. From the first gear the synchronizer transmits the power to the mainshaft, which is connected to the driveshaft. The student is told to move the first and second gear synchronizer manipulative piece on the simulator to engage first gear and place the arrow manipulative pieces to show the power flow through the transmission. In response to this the student should arrange the proper manipulative pieces on the simulator board to the arrangement as shown in FIG. 4. After the student has constructed his arrangement on the simulator board the visual portion of the presentation shows the student what the correct arrangement should look like for him to check with that which he has constructed on the board.

Figure 5:
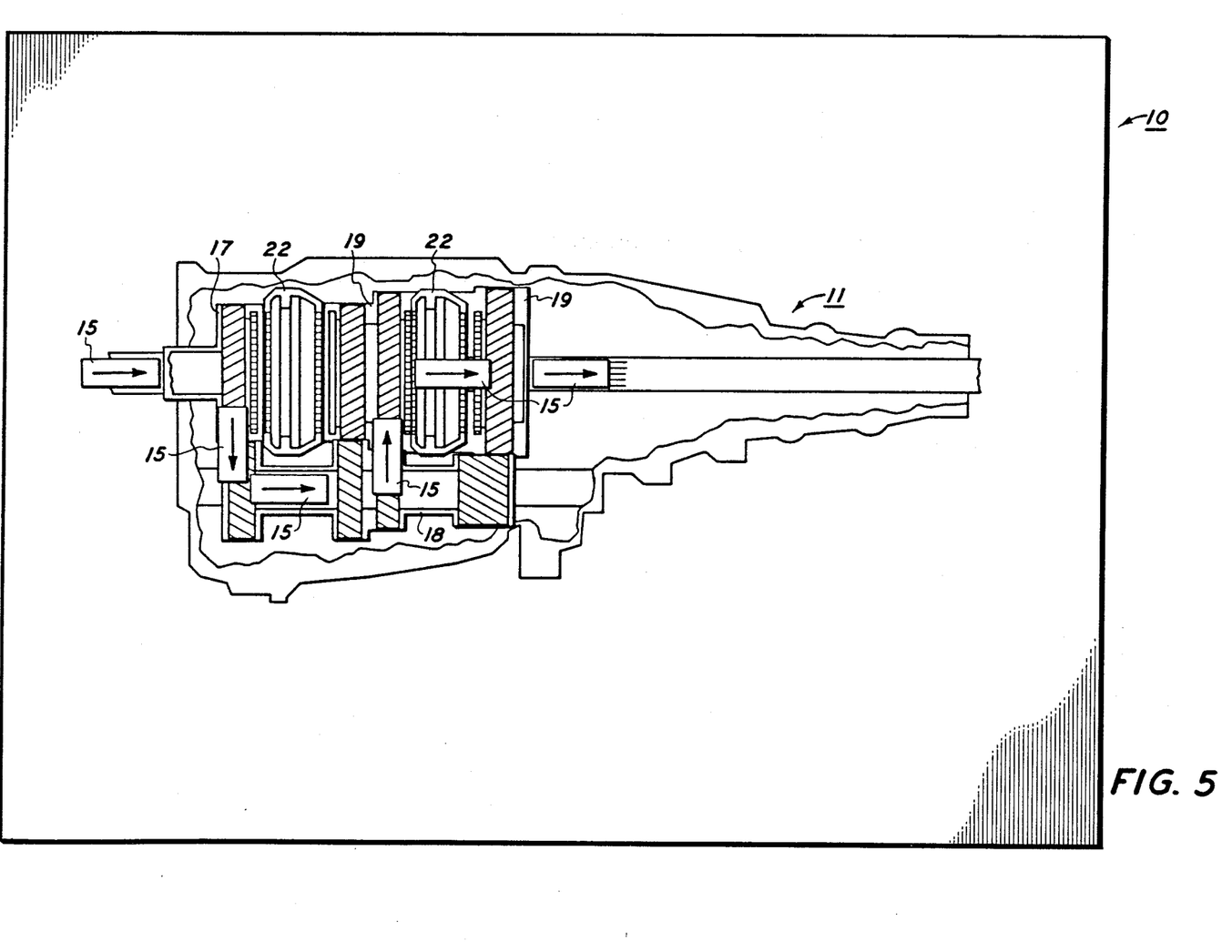
FIG. 5 is a second plan view of the simulator board shown in FIG. 1 with certain of the manipulative pieces as shown in FIG. 3 in place on the board.
Figure 6:
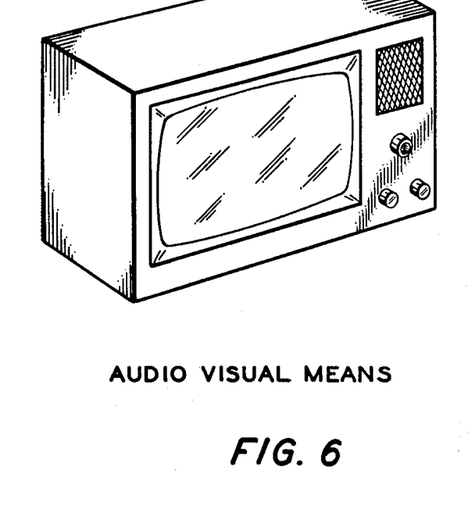
FIG. 6 illustrates generally an audiovisual device suitable for use in the present invention.
Figure 7:
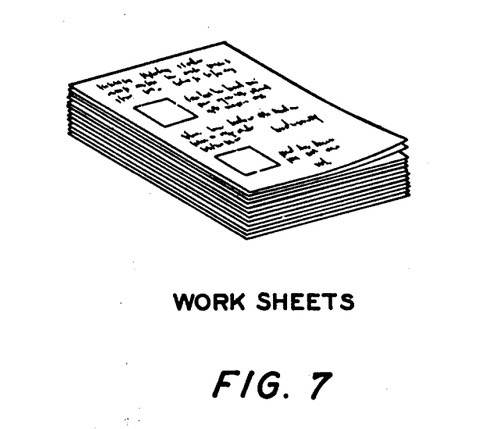
FIG. 7 illustrates generally worksheets in accordance with the present invention.
Figure 8:
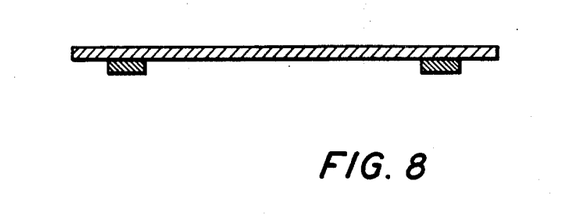
FIG. 8 is a side sectional view of a typical manipulative piece in accordance with the invention showing smaller magnetic sections laminated to the underside of the piece.

The presentation then explains that to shift from first to second gear, the driver first depresses the clutch peddle thus disengaging the clutch. This causes the flow of power from the engine to be stopped at the fly wheel. The input shaft in the gears and the transmission continue rotating but at a reduced speed and under no power. The driver then moves the gear shift into neutral which moves the synchronizer away from first gear to its neutral position between first and second gear. He then moves the gear shift into second gear position, which causes the synchronizer to move toward second gear. As the synchronizer moves between gears, it first contacts a blocking ring which slows down the gear until the speed of the synchronizer and the gear are the same. At this point, the synchronizer locks on to the blocking ring and the gear. Since the synchronizer is splined onto the mainshaft, the power of that gear is now transmitted to the mainshaft. After this explanation the student is told to shift the simulator synchronizer to the second gear position and show by the use of arrow manipulative pieces 15 the power flow in second gear. The simulator board having this arrangement is as shown in FIG. 5.

In a similar manner as described above the student can disengage the second gear synchronizer and move the synchronizer located between third and fourth gears so that it engages third gear. Then, with a plurality of arrow manipulative pieces 15, the student can rapidly depict the power flow through the transmission illustrating the power flow in third gear. Similarly, the power flow in fourth gear can be graphically depicted on the simulator board.

The presentation next focuses on the positioning and function of the reverse gear 20 and the reverse idler shaft 21 in the standard transmission. The presentation explains that the reverse idler shaft is located in front of the countershaft which is used for the forward gear while the reverse gear is positioned on the mainshaft in front of the mainshaft gears. The presentation explains that reverse gear does not engage with a synchronizer and it usually moves into position to engage the reverse idler gears. In order to reverse the direction of rotation of the driveshaft, the power flow in reverse must pass through an extra gear. In the forward speeds, the counter gear is necessary to make the driven gear rotate in the same direction as the driving gear. In reverse gear, one more gear must be added to reverse the power flow again. The input gear drives the countershaft which in turn drives the reverse idler shaft. The right-hand gear on the reverse idler shaft drives the reverse gear.

After using the educational kit in accordance with the present invention the student will be able to decide whether the transmission should deliver more torque or more speed to the driving wheels, given various driving conditions; analyze simple two, three or four gear sets to determine whether the sets increase torque or speed; state the formula for calculating a simple gear ratio; calculate the gear ratios for simple two, three or four gear sets; state the purpose of a counter gear; identify the driving and driven gears in a four-gear set; identify the various gear shafts in a typical transmission; describe the function of synchronizers in changing gears; describe the function of the blocking rings for the forward gears; state which parts of the transmission are involved in the flow of power for specific forward gear of for reverse gear; and identify various gear ratios as typical of first, second, third, fourth or reverse gear.

Details of the various methods by which students can use the educational kit of this invention are explained in detail in "Occupational Technology Series, Automotive Technology, Principles of Standard Transmission, Unit 10289-80" published by the Xerox Corporation.

I claim:

1. An educational kit programmed for teaching the operation of a standard transmission comprising in combination:
   a. a simulator board having a surface of magnetically attractive material and having specific graphic indicia on the surface thereof defining a schematic sectional view of an automobile transmission housing, the indicia on said simulator board being as shown by the non-numerical indicia of FIG. 1;
   b. a plurality of magnetically attractive manipulative pieces each individually bearing on their surfaces graphic indicia defining items relating to the subject matter of standard transmissions, said pieces comprising (i) a plurality of pieces containing indicia defining the names of various portions of said sectional view of the transmission housing, said pieces adapted for positioning within the confines of the simulator board for identifying various portions of said transmission housing; (ii) a plurality of pieces adapted for positioning within the confines of said transmission housing including pieces schematically representing an input gear, countershaft gears, mainshaft gears, synchronizers, reverse gear, and a reverse idler shaft, each adapted for positioning within said transmission housing whereby the proper gear arrangements that are involved in the flow of power for a specific forward gear or reverse gear can be graphically depicted; and (iii) a plurality of pieces representing arrows, each of said arrow pieces adapted for positioning with the pieces defined in (ii) whereby the power flow through the transmission when engaged in a particular gear arrangement can be graphically depicted; said magnetically attractive board or alternatively each of said magnetically attractive pieces being magnetic to provide a mutual attraction between said board and said pieces, the indicia on said manipulative pieces being as shown by the non-numerical indicia of FIG. 3;
   c. a display board for said manipulative pieces including a sheet of magnetically attractive material, said display board having graphic indicia on a surface thereof in spaced relationship, said graphic indicia corresponding to the indicia present on each of said manipulative pieces, said manipulative pieces adapted for storage on and removal from said display board; and
   d. audio-visual instructional means for presenting information relevant to the operation of a standard transmission including information defining the indicia on said pieces and the indicia on said simulator board, whereby (i) various parts of a standard transmission can be properly identified, (ii) the proper location of the gears in a standard transmission when in position for first, second, third, fourth or reverse gear can be properly determined and simulated and (iii) the power flow through the transmission for a specific foward gear or for reverse gear may be simulated, by positioning and manipulating said pieces on said simulator board in response to said instructional means;

said audiovisual instruction means having visual and audio instructional portions terminating in audio directions to the user of the kit to perform a manipulative activity using said simulator board, said instruction means stopping upon completion of said audio directions and being restartable by the user upon completion of said manipulative activity.

2. An educational kit according to claim 1 wherein the non-numerical graphic indicia on said display board is substantially as shown in FIG. 2.

3. An educational kit according to claim 1 wherein said manipulative pieces are magnetic.

4. An educational kit according to claim 3 wherein said manipulative pieces include a substantially flat sheet of a substantially rigid material having a smaller section of a magnetic material laminated thereto.

5. An educational kit according to claim 1 wherein said audio instructional means includes tape recordings which are synchronized with said visual instructional means which include slides or film strips.

6. An educational kit according to claim 1 further including a plurality of student worksheets, said worksheets being adapted for use by the student to record information and test the students response to said audio visual instructional means.

7. An educational kit according to claim 1 wherein said simulator board, said manipulative pieces, and said display board are constructed of a substantially rigid material.

8. An educational kit according to claim 1 further comprising a compartmentalized case, said case being adapted for storage of said kit.

* * * * *